(12) United States Patent
Naylor et al.

(10) Patent No.: US 8,033,230 B2
(45) Date of Patent: *Oct. 11, 2011

(54) METHOD AND APPARATUS FOR REGULATING AIR FLOW THROUGH SUPPLY CONDUITS THROUGH WHICH PRODUCT ENTRAINED IN AN AIR FLOW IS PROVIDED TO MULTIPLE ON-ROW PRODUCT CONTAINERS OF AN AGRICULTURAL IMPLEMENT

(75) Inventors: Matthew S. Naylor, Saskatoon (CA); George Neufeld, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,867

(22) Filed: Dec. 6, 2010

(65) Prior Publication Data

US 2011/0073027 A1 Mar. 31, 2011

Related U.S. Application Data

(62) Division of application No. 12/480,016, filed on Jun. 8, 2009, now Pat. No. 7,866,269.

(51) Int. Cl.
*A01C 7/00* (2006.01)
*A01C 9/00* (2006.01)
*A01C 15/00* (2006.01)
(52) U.S. Cl. ........................ 111/176; 111/900
(58) Field of Classification Search .................. 111/170, 111/174–188, 900, 200; 221/211
See application file for complete search history.

(56) References Cited

U.S. PATENT DOCUMENTS

| | | | |
|---|---|---|---|
| 3,490,654 | A | 1/1970 | Fischer |
| 3,964,639 | A | 6/1976 | Norris et al. |
| 4,280,419 | A | 7/1981 | Fischer |
| 4,562,968 | A | 1/1986 | Widmer et al. |
| 4,872,785 | A | 10/1989 | Schrage et al. |
| 5,392,722 | A | 2/1995 | Snipes et al. |
| 5,775,585 | A | 7/1998 | Duello |
| 5,915,312 | A | 6/1999 | Meyer et al. |
| 5,979,343 | A | 11/1999 | Gregor et al. |
| 6,308,646 | B1 | 10/2001 | Luxon |
| 6,505,569 | B1 | 1/2003 | Richard |
| 6,644,225 | B2 | 11/2003 | Keaton |
| 6,675,728 | B2 | 1/2004 | Lee et al. |
| 6,782,835 | B2 | 8/2004 | Lee et al. |
| 6,994,038 | B2 | 2/2006 | Mariman et al. |
| 7,162,962 | B2 | 1/2007 | Fuessel et al. |
| 7,413,387 | B2 | 8/2008 | Pleyer |
| 2006/0243179 | A1 | 11/2006 | Landphair et al. |
| 2007/0022928 | A1 | 2/2007 | Kowalchuk |

*Primary Examiner* — Christopher J. Novosad
(74) *Attorney, Agent, or Firm* — Rebecca Henkel; Sue Watson

(57) ABSTRACT

The present invention provides a method and apparatus to improve seed distribution to a plurality of seed or row units of an agricultural planter. Each row unit is fitted with a seed box having an air/seed inlet and an air outlet through which air is allowed to escape. The present invention effectively closes off or substantially reduces the flow of air out of one or more of the seed boxes to reduce the amount of seed that is fed to the seed boxes. Through the use of restrictor plates, which may be vented to allow some air flow or solid to prevent air flow, the delivery of seed to the seed boxes can be equalized to provide more uniform seed distribution to the row units.

4 Claims, 6 Drawing Sheets

METHOD AND APPARATUS FOR REGULATING AIR FLOW THROUGH SUPPLY CONDUITS THROUGH WHICH PRODUCT ENTRAINED IN AN AIR FLOW IS PROVIDED TO MULTIPLE ON-ROW PRODUCT CONTAINERS OF AN AGRICULTURAL IMPLEMENT

CROSS-REFERENCE TO RELATED APPLICATIONS

This application is a divisional of U.S. patent application Ser. No. 12/480,016, entitled "Method And Apparatus For Regulating Air Flow Through Supply Conduits Through Which Product Entrained In An Airflow Is Provided To Multiple On-Row Product Containers Of An Agricultural Implement," filed on Jun. 8, 2009 now U.S. Pat. No. 7,866,269, which is hereby incorporated in its entirety.

BACKGROUND OF THE INVENTION

The present invention relates generally to agricultural implements having a bulk delivery system that supplies product entrained in a forced air flow to multiple on-row hoppers through multiple supply conduits, which may include supply conduits of different lengths, and, more particularly, to a method and apparatus for equalizing distribution of an air/seed mixture to a plurality of on-row hoppers or seed boxes.

Row crop planters typically consist of six or more individual planting or seed units, commonly referred to as "row units", attached to a tool bar or frame that is towed across a planting surface by a towing vehicle, e.g., tractor. Planters with as many as 36 row units are increasingly common. These row units are either supplied with seed by individual "on-row" hoppers (seed boxes) or by a central system consisting of one or more large tanks. For planters having a central fill system, seed is delivered from the central tank(s) to the individual row units through distribution hoses (runs). Typically, an air delivery system entrains the seed in a forced air stream that is fed to the individual row units. The product is dumped into localized storage tanks for the row units. Each of the localized storage tank has a vented air outlet through which air passes to vent the air to atmosphere. The use of a central tank and distribution network allows for increased seed storage and hence less stops to reload seed. In addition, when refilling is necessary, only the large storage tanks need to be refilled, which also saves stoppage time.

While generally effective, there are some issues with distributing seed or other granular product from a central tank(s) to the individual row units. More particularly, the lengths of the distribution hoses are not the same for each row unit. That is, the length of the distribution hoses increases as the distances from the row units from the central tank(s) increase. As a result, air distribution may be undesirably uneven through runs or distribution hoses of different lengths. While some deviation may be tolerated, too high a differential can lead to plugging on short runs and insufficient product delivery on long runs.

Therefore, there is a need for a product distribution system for use with a planter that is capable of providing greater equalization between distribution hoses or runs of different lengths and as a result, more uniform seed collection by the row units.

SUMMARY OF THE INVENTION

The present invention overcomes the aforementioned drawbacks by selectively restricting air flow through the air vents of the localized storage tanks for the individual row units. In operation, multiple product/air streams are fed from one or more central tanks to the row units. Each row unit has a corresponding "on-row" hopper or storage tank where the product is collected. The product may then be fed from the on-row hoppers to the dispensing ports of seed units for depositing the product onto the planting surface. In this regard, the on-row hoppers have an air/product inlet and a product outlet. The on-row hoppers also have air outlets that allows air to escape. In order to equalize, or otherwise control the flow of air, and seed, through the various runs of distribution hoses, the present invention provides an apparatus that restricts the escape of air from one or more of the on-row hoppers. In one preferred implementation, the present invention restricts air escape for those on-row hoppers that are flow coupled to the central tank(s) by a short distribution hose, without changing the escapement of air from the on-row hoppers flow coupled to the central tank(s) by a longer distribution hose. By restricting air escapement from the on-row hoppers associated with the shorter runs, the differentials in air pressure for all the on-row hopper distribution lines can be reduced. Thus, the present invention makes it possible to have a uniform product collection across all runs despite the differences in run lengths. In another implementation, a desired, uneven distribution may be obtained through judicious restriction of air exhaustion from the on-row hoppers.

It will be appreciated that the present invention, when compared to meter-box orifices or diverter plates, is believed to offer a number of performance and cost advantages. For example, it is believed that restrictor plates mounted to the on-row hoppers adjacent to the air outlets provide less air disturbance, and hence less power loss, compared to other proposed solutions, such as the aforementioned meter-box orifices or diverter plates. Additionally, it is believed that restrictor plates provide greater air flow control and are more reliable. It is also believed that the restrictor plates may be installed relatively easily and may also be used to retrofit existing planters.

In accordance with another aspect of the invention, a row crop planter includes a tool bar adapted to be towed along a planting surface by a towing vehicle. A bulk fill hopper assembly is supported by the tool bar and is configured to store product to be deposited onto the planting surface. The planter includes a plurality of planting units supported by the tool bar and a plurality of on-row hoppers associated with the plurality of planting units and flow coupled to the bulk fill hopper. Each on-row hopper is configured to receive product entrained in an air/product stream from the bulk fill hopper and store product for a respective one of the planting units. Each on-row hopper includes an air/product inlet, a product outlet flow coupled to a respective one of the planting units, and an air outlet through which air may be exhausted. One or more restriction plates are mounted within one or more on-row hoppers to restrict air exhaustion from the one or more on-row hoppers.

According to another aspect of the invention, a row crop planter is provided. The planter includes a tool bar adapted to be towed along a planting surface by a towing vehicle. A bulk fill assembly is mounted to the tool bar and includes a bulk fill hopper adapted to hold product to be deposited onto the planting surface. A product conveyance assembly is operative to control the flow of product from the bulk fill hopper. The planter includes also includes a plurality of planting units mounted to the tool bar, which includes a first planting unit and a second planting unit. A first on-row hopper is associated with the first planting unit and a second on-row hopper is associated with the second planting unit. Each on-row hopper includes a product holding tank supported by the tool bar, an inlet in fluid communication with the bulk fill hopper such that product entrained in a forced air stream is delivered to the product holding tank through the inlet, a product outlet through which product is delivered from the product holding tank to an associated planting unit outlet, and an air outlet through which air is exhausted from the product holding tank. A first cover plate is mounted to the product holding tank for the first on-row hopper to allow air flow through the air outlet from the product holding tank at a first flow rate. A second cover plate is mounted to the product holding tank for the second on-row hopper to allow air flow through the air outlet from the product holding tank at a second flow rate greater than the first flow rate. In one embodiment, the first flow rate is substantially less than the second flow rate.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
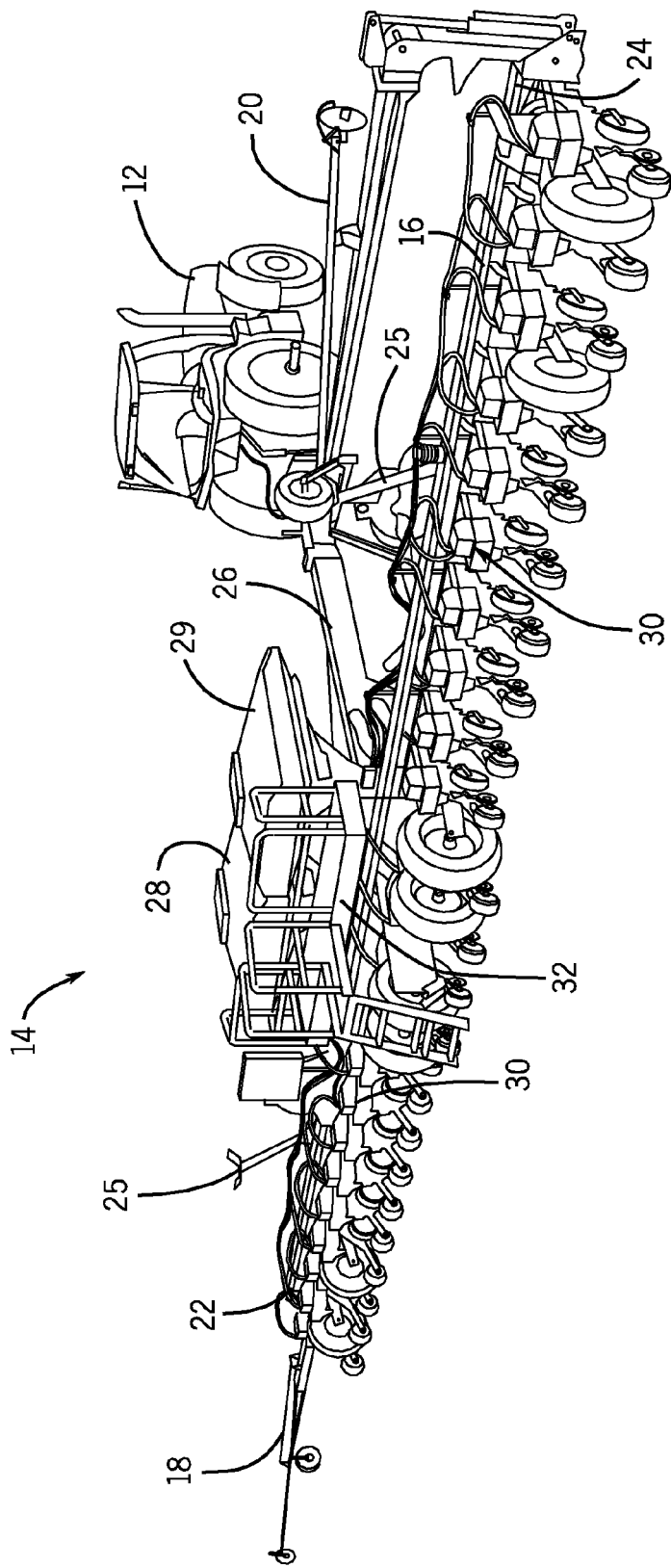
FIG. 1 is a pictorial view of an agricultural planter according to one aspect of the invention.
Figure 2:
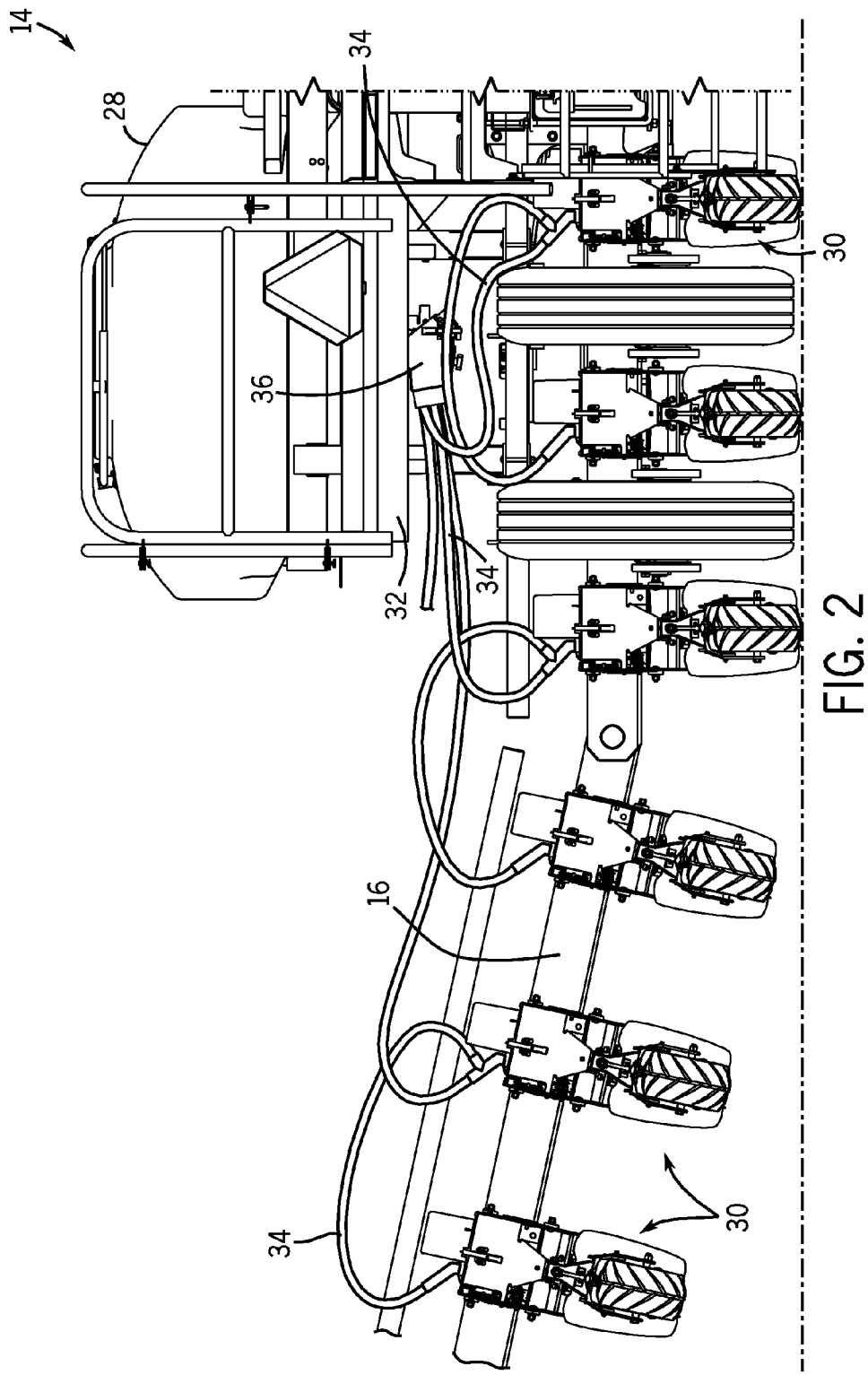
FIG. 2 is a rear elevation view of the agricultural planter of FIG. 1.

Referring now to the drawings, and more particularly to FIG. 1, there is shown an agricultural work system 10 that includes an agricultural work vehicle, such as tractor 12 that tows an agricultural implement 14, which is depicted as a multi-row pivot transport seeder. Seeder 14 can include a toolbar 16 with left and right marker assemblies 18, 20 that are attached to left and right ends 22, 24 of toolbar 16, respectively. Supports 25 can support marker assemblies 18, 20 when in a folded position.

Seeder 14 can include other elements such as drawbar 26 for connection to tractor 12, large storage tanks 28, 29 which provide seeds to row or seed units 30, and platform and gate assembly 32 for accessing and filling large seed hoppers 28, 29. Row or planting units 30 can include a variety of elements for dispensing seed, fertilizer, pesticide, herbicide and other agricultural materials. Such elements can include, but are not limited to, a furrow opening apparatus, gage wheels, a pair of lateral spaced, or staggered, furrow opener discs, a runner-type opener for providing a furrow in the ground, a pair of furrow closer discs, a seed meter, a press wheel arranged in fore-and-aft relationship relative to each other, and an agricultural chemical hopper. Additionally, seeder 14 can have planting units 30 with individual seed boxes in addition to the large storage tanks 28, 29.

As noted above, the seeder 14 has a pair of bulk fill storage tanks or hoppers 28, 29. Bulk fill hopper 28 holds seed for the seed units 30 mounted to the left wing of frame 16 and bulk fill hopper 29 holds seed for the seed units 30 mounted to the right wing of frame 16. The seed units 30 are flow coupled to its bulk fill hopper by supply hoses 34. Seed is metered from the bulk fill hopper 28 to the hoses by a seed metering assembly 36, as known in the art.

Figure 3:
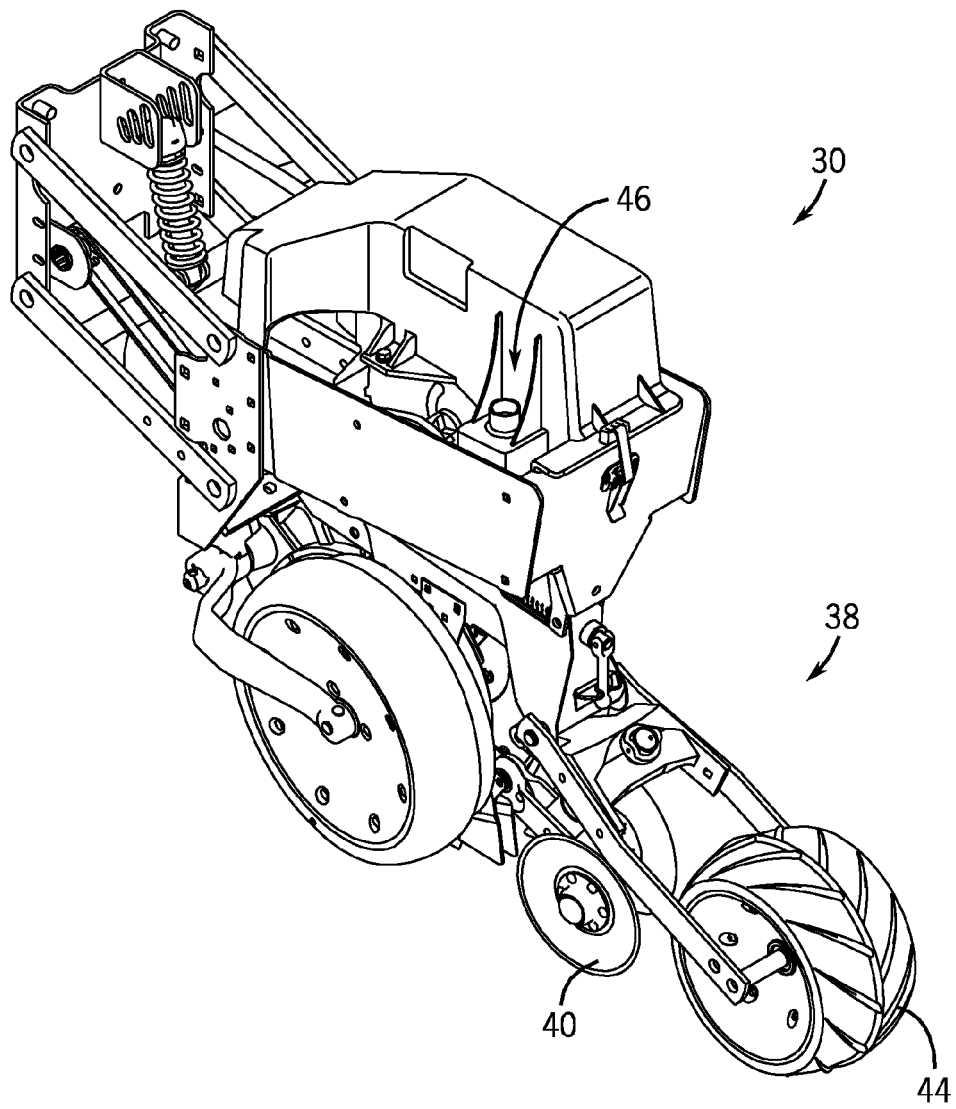
FIG. 3 is an isometric view of a row unit assembly of the agricultural planter of FIG. 1.

Referring now to FIG. 3, as known in the art, each seed or row unit 30 includes a furrow opening apparatus 38 having furrow opening discs (not shown) and furrow closing discs 40, 42 and a packer wheel 44. The opening discs (not shown) cut a furrow into the planting surface and seed (or fertilizer) is deposited into the furrow. Thereafter, the furrow closing discs 40,42 and trailing packer wheel 44 causes soil to fall back into the furrow to cover the seed and then packs the planting surface. Each row unit 30 also includes an on-row hopper (or mini-hopper) 46 where seed is fed to the row unit 30 from the centralized storage tanks 28 or 29 is collected and stored. In a conventional manner, the seed is drawn from the on-row hopper 46 and is deposited into a furrow formed in the planting surface that is subsequently closed by discs 40 and 42 and packed by wheel 44.

Figure 4:
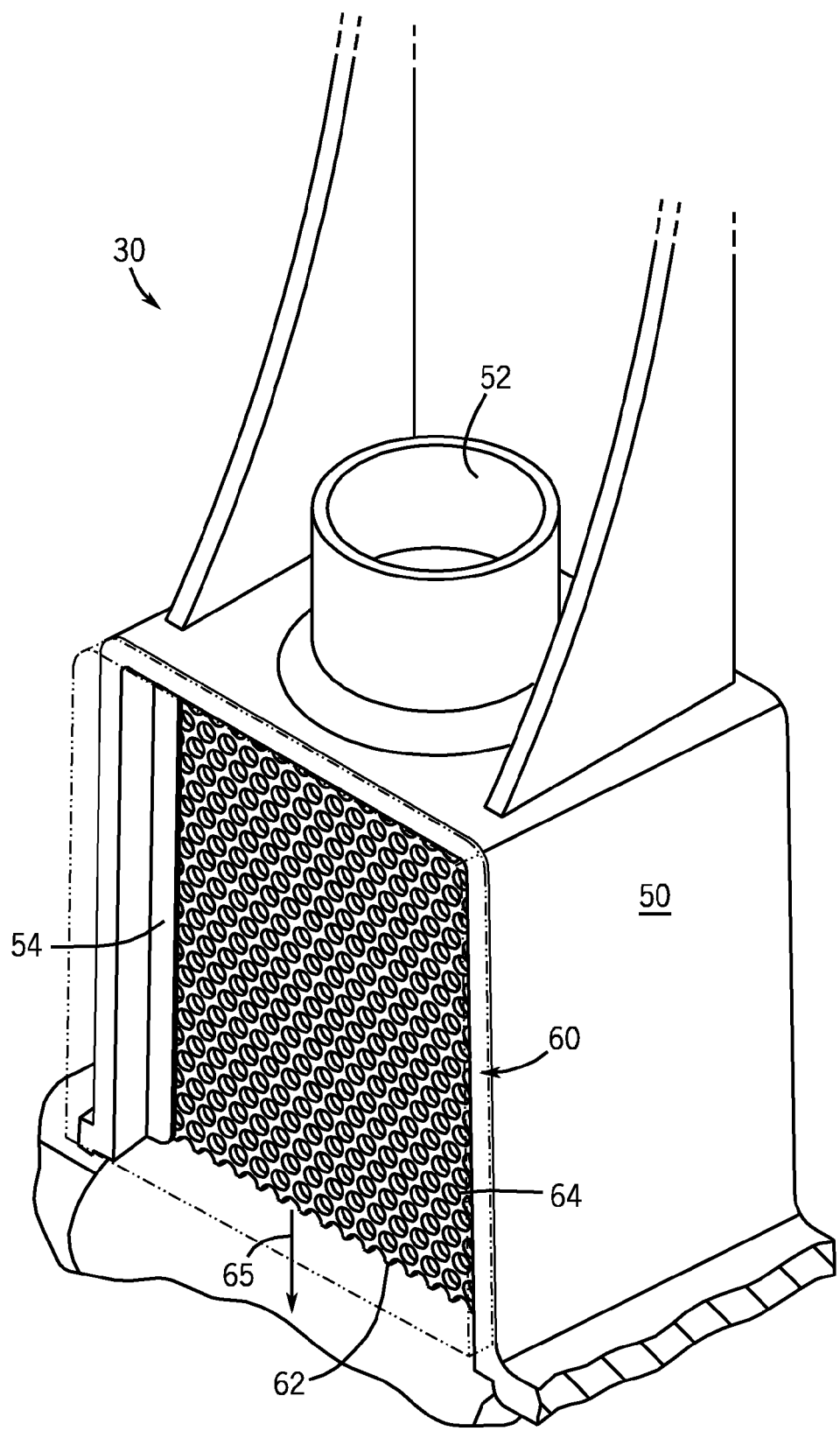
FIG. 4 is an isometric view of an on-row hopper of the row unit assembly.
Figure 5:
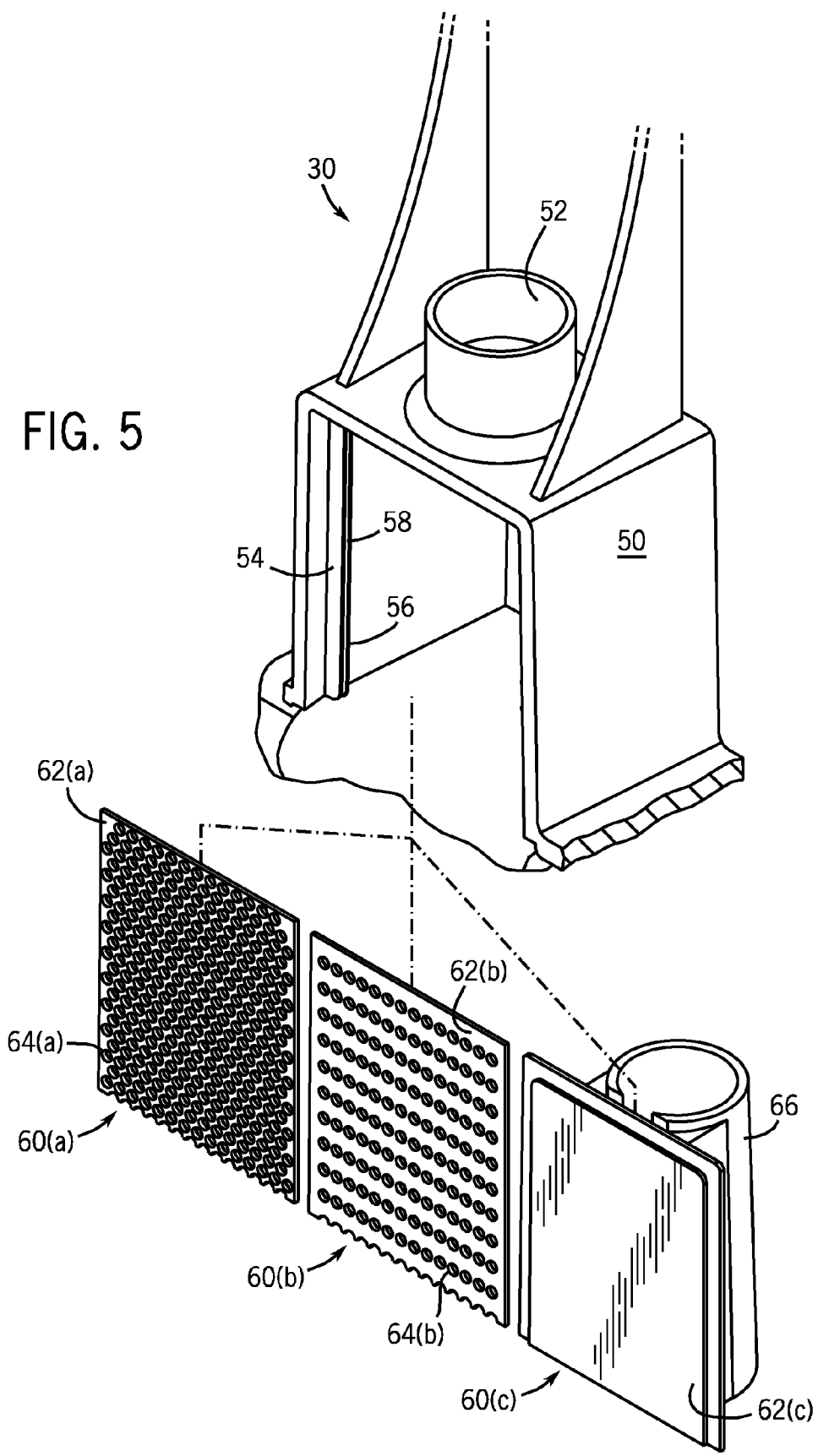
FIG. 5 is an exploded view of the on-row hopper of FIG. 4 illustrating various air flow restrictor members that may be used with the on-row hopper and to control the flow of air out of the on-row hopper.

Referring now to FIGS. 4 and 5, the on-row hopper 46 is generally comprised of a seed box 50 having an air/seed inlet 52 through which seed entrained in a forced air flow is fed to the seed box 50. The seed box 50 also has a seed outlet (not shown) from which seed is drawn and deposited onto the planting surface. Formed along the interior walls of the seed box 50 is a pair of flanges 54, 56 that collectively define a channel or groove 58. The groove 58 is sized to receive an outer edge of a flow restrictor member 60 that is mounted within the seed box 50. The restrictor member 60 is designed to allow air to escape from the seed box 50 without letting seed escape. The flow restrictor 60 has a generally planar member 62 with a plurality of holes or orifices 64 formed therein. The orifices 64 are sized such that seed cannot pass through them but air is allowed to escape. Thus, seed entrained in the forced air flow will effectively drop from the air flow as the air passes through the flow restrictor 60. The air that passes through the restrictor 62 then passes through an air outlet (designated by arrow 65) formed in the lower surface of the seed box 50. In this regard, the flow restrictor 60 effectively divides the seed box into a seed collection portion and an air venting portion.

As seed is collected in the seed box 50, the orifices 64 of the flow restrictor 60 will become blocked. As the orifices become blocked, less air will be allowed to escape from the seed box 50. As (substantially) all of the orifices 64 become blocked, a back pressure will develop in the supply hose to the seed box that will significantly decrease seed delivery to the seed box 50. Thus, when the seed box is (substantially) full, additional seed will not be fed to the seed box 50. As seed is drawn from the seed box 50 and deposited onto the planting surface, the back pressure will reduce as air is allowed to escape, and more seed will be fed to the seed box.

As shown in FIG. 1, the row units 30 are spaced laterally away from the storage tanks 28, 29. As a result, longer supply hoses are used to flow couple the seed boxes of the outer row units than those used for the inner row units. These differences in hose lengths can greatly impact seed distribution to the row units. In other words, as the air pressure at the seed metering system 36 is relatively fixed, air flow through the shorter hoses will be greater than the air flow through the longer hoses. That is, the back pressure in the shorter hoses is less than the back pressure in the longer hoses. This creates a flow differential that can lead to plugging of the shorter hoses or runs and insufficient seed delivery to those seed boxes associated with the longer hoses or runs.

The inventors have found that this back pressure differential can be nullified, or exploited in a desired manner, through the judicious use of restrictors 60 having different flow characteristics. Three exemplary restrictors are shown in FIG. 5. Restrictor 60(a) is similar to that shown in FIG. 4 and includes a densely packed plurality of small orifices 64(a) formed in a planar member 62(a). Restrictor 60(b) is similar to restrictor 60(a) as it includes a plurality of orifices 64(b) formed in a planar member 62(b). Compared to restrictor 60(a), orifices 64(b) are spaced farther apart. While generally the same size as the orifices 64(a) of restrictor 60(a), the spacing of the orifices 64(b) will cause less air to pass through restrictor 60(b) compared to restrictor 60(a). Restrictor 60(c), unlike the aforedescribed restrictors, is designed to greatly reduce, if not substantially eliminate, the exhaustion of air from the seed box 50 through the air outlet. The restrictor 60(c) has a solid member 62(c) and is therefore substantially free of any orifices or other openings that would otherwise allow air to escape the seed box. As known, the row units are not airtight assemblies. As a result, for a seed box outfitted with restrictor 60(c), air would be prevented from being exhausted through the air outlet, but could be exhausted through various other escape points of the row unit.

Figure 6:
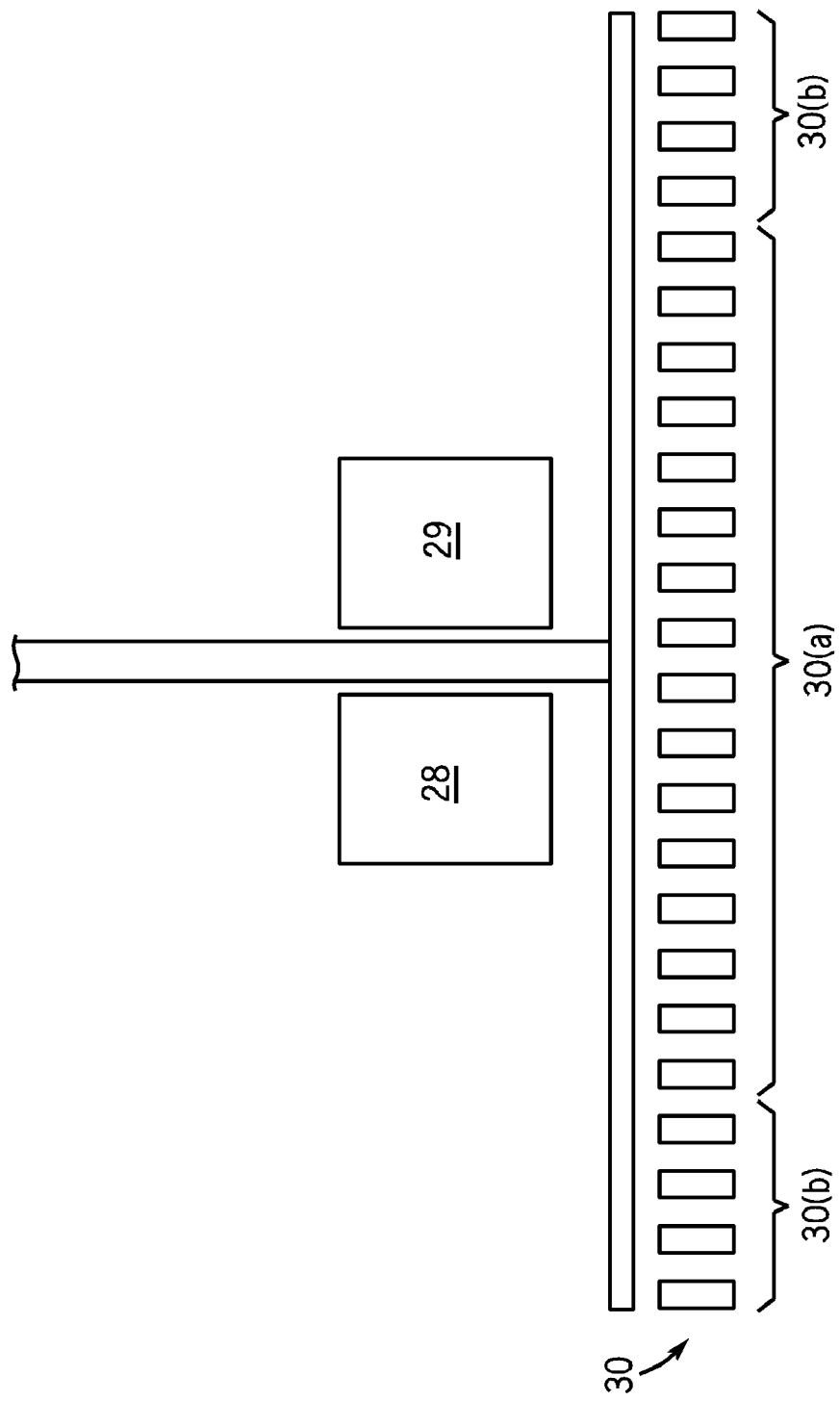
FIG. 6 is a schematic diagram of a bulk fill assembly and a plurality of row units in which restrictor plates according to the present invention are used to provide a desired flow profile for the plurality of row units.

FIG. 6 schematically illustrates a configuration in which the row units 30 are segmented into two sets: an inner set 30(a) and an outer set 30(b). In this configuration, each of the seed boxes for the inner set 30(a) of row units is outfitted with a restrictor that substantially blocks air flow through the air outlet, such as restrictor 60(c). Each of the seed boxes for the outer set 30(b) of row units is outfitted with a vented restrictor that allows air flow, such as restrictors 60(a) and 60(b).

In another preferred embodiment, the row units are segmented into three sets based on their spacing from the centralized storage tanks 28, 29. The set farthest from the tanks could be outfitted with restrictors 60(a) and the set closest to the tanks could be outfitted with the restrictors 60(c). The set between those two sets could be outfitted with restrictors 60(b). With such a configuration, the pressure differential described above could be lowered so that seed is fed to the plurality of row units in a more uniform manner.

It is understood that the number, size, and shape of the openings could be different from those illustrated in the foregoing figures. It is also contemplated that the number of restrictors could be different from that described herein. That is, it is contemplated that each row unit could have a unique restrictor based on the length of the hose that flow couples the seed box for the row unit to the seed metering assembly.

It will be appreciated that the present invention provides for balanced seed (or other granular material) distribution for agricultural planters having numerous distribution hoses or runs. Moreover, the present invention may be used to retrofit existing seed boxes in a cost effective manner to provide for improved balancing. It is believed that the present invention provides operational advantages over other balancing techniques. For instance, it is believed that the present invention provides less air disturbance (and hence less power requirements), better control, and more reliability than other proposed solutions.

Many changes and modifications could be made to the invention without departing from the spirit thereof. The scope of these changes will become apparent from the appended claims.

We claim:

1. A method of supplying seed entrained in a forced air flow from a centralized source to a plurality of row units, comprising:

for a first set of row unit assemblies, forcing air, with seed entrained therein, to the first set of row unit assemblies and allowing air to escape from the first set of row unit assemblies at a first flow rate as the seed is collected in the first set of row unit assemblies; and for a second set of row unit assemblies, forcing air, with seed entrained therein, to the second set of row unit assemblies and allowing air to escape from the second set of row unit assemblies at a second flow rate less than the first flow rate as the seed is collected in the second set of row unit assemblies;

wherein the second set of row unit assemblies are flow coupled to the centralized source via conduits that are shorter in length than those flow coupling the first set of row unit assemblies to the centralized source;

wherein each row unit assembly has a hopper, an air/seed inlet, a seed outlet, and an air outlet, and further comprising a first set of cover plates mounted to the first set of on-row hoppers, the first set of cover plates having a plurality of orifaces therethrough to allow air exhaustion from the first set of on-row hoppers through the orifaces; and a second set of cover plates mounted to the second set of on-row hoppers, the second set of cover plates being free of orifaces to substantially prevent air exhaustion from the second set of on-row hoppers through the second set of cover plates.

2. The method of claim 1 wherein said plurality of orifices adjacent the air outlet for each of the first set of row unit assemblies and mounting a member substantially free of any orifices adjacent the air outlet for each of the second set of row unit assemblies.

3. The method of claim 1 wherein said plurality of first orifices adjacent the air outlet for each of the first set of row unit assemblies and mounting a member having a plurality of second orifices adjacent the air outlet for each of the second set of row unit assemblies, wherein the second orifices are smaller than the first orifices.

4. The method of claim 1 wherein said plurality of first orifices adjacent the air outlet for each of the first set of row unit assemblies and mounting a member having a plurality of second orifices adjacent the air outlet for each of the second set of row unit assemblies, wherein the second orifices are spaced farther apart from one another than the first orifices.

* * * * *